(12) United States Patent
Oh et al.

(10) Patent No.: US 10,377,410 B2
(45) Date of Patent: Aug. 13, 2019

(54) ELECTRIC POWER STEERING APPARATUS

(71) Applicant: MANDO CORPORATION, Gyeonggi-do (KR)

(72) Inventors: Jin Su Oh, Gyeongsangbuk-do (KR); Jong Hoon Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 138 days.

(21) Appl. No.: 15/364,215

(22) Filed: Nov. 29, 2016

(65) Prior Publication Data
US 2017/0158224 A1 Jun. 8, 2017

(30) Foreign Application Priority Data

Dec. 8, 2015 (KR) .................. 10-2015-0173699

(51) Int. Cl.
*B62D 5/04* (2006.01)
*F16G 1/28* (2006.01)
(Continued)

(52) U.S. Cl.
CPC ......... *B62D 5/0424* (2013.01); *B62D 5/0445* (2013.01); *F16G 1/10* (2013.01);
(Continued)

(58) Field of Classification Search
CPC .......... B62D 5/0424; F16G 1/28; F16H 7/023
See application file for complete search history.

(56) References Cited

U.S. PATENT DOCUMENTS 4,311,474 A * 1/1982 Standley .................. F16G 1/28
156/137
4,702,729 A * 10/1987 Tanaka ..................... F16G 5/20
474/205
(Continued)

FOREIGN PATENT DOCUMENTS

CN 1860056 11/2006
CN 101024402 8/2007
(Continued)

OTHER PUBLICATIONS

Office Action dated Oct. 31, 2017 for German Patent Application No. 10 2016 223 846.9 and its English machine translation by Google Translate.
(Continued)

*Primary Examiner* — Michael R Mansen
*Assistant Examiner* — Mark K Buse
(74) *Attorney, Agent, or Firm* — Ladas & Parry, LLP

(57) ABSTRACT

The present invention relates to an electric power steering apparatus including a power transmission belt. The power transmission belt includes: an engagement part provided inside the power transmission belt where the power transmission belt is engaged with a motor pulley and a nut pulley; and a vibration reduction part provided outside the power transmission belt opposite to the engagement part. The engagement part is made of an elastic material, and the vibration reduction part is made of an elastic material that is less rigid than the engagement part. With this configuration, even if vibration and noise are generated from a motor, between the motor and a pulley, and between a belt and the pulley in the process of transmitting a torque of the motor, the vibration and the noise are reduced and prevented from being transferred to a peripheral component.

8 Claims, 10 Drawing Sheets

(51) Int. Cl.
  *F16H 7/02*   (2006.01)
  *F16G 1/10*   (2006.01)
  *F16G 5/08*   (2006.01)
  *F16G 5/20*   (2006.01)
  *F16H 25/20*  (2006.01)

(52) U.S. Cl.
  CPC .............. *F16G 1/28* (2013.01); *F16G 5/08* (2013.01); *F16G 5/20* (2013.01); *F16H 7/023* (2013.01); *F16H 25/20* (2013.01); *F16H 2025/2096* (2013.01)

(56) References Cited

U.S. PATENT DOCUMENTS

| | | | | |
|---|---|---|---|---|
| 5,382,198 A * | 1/1995 | Janne | ........................ | F16G 5/20 474/205 |
| 7,008,341 B2 * | 3/2006 | Wilson | ...................... | F16G 5/20 474/205 |
| 7,748,501 B2 * | 7/2010 | Marler | ..................... | B66B 7/062 187/251 |
| 9,909,647 B2 * | 3/2018 | Nonaka | ................... | C08L 23/16 |
| 2003/0069101 A1 * | 4/2003 | Pitts | ........................ | D07B 5/006 474/260 |
| 2005/0113199 A1 * | 5/2005 | Schoendienst | ............ | F16G 1/28 474/251 |
| 2012/0058851 A1 * | 3/2012 | Shimizu | .................... | F16G 1/28 474/153 |
| 2012/0071286 A1 * | 3/2012 | Pasch | ..................... | B29D 29/08 474/205 |
| 2013/0040771 A1 * | 2/2013 | Well | .......................... | F16G 1/10 474/205 |
| 2014/0287862 A1 * | 9/2014 | Yamada | ................... | F16G 1/10 474/204 |
| 2014/0296011 A1 * | 10/2014 | Yoshida | ................... | F16G 5/08 474/261 |
| 2014/0364260 A1 * | 12/2014 | Takahashi | ................. | C08J 5/04 474/263 |

FOREIGN PATENT DOCUMENTS

| | | |
|---|---|---|
| CN | 103403389 | 11/2013 |
| CN | 104417606 | 3/2015 |
| JP | 2014-98432 | 5/2014 |

OTHER PUBLICATIONS

Office Action dated Sep. 3, 2018 for Chinese Patent Application No. 201611121829.2 and its English machine translation by Google Translate.

* cited by examiner

ELECTRIC POWER STEERING APPARATUS

CROSS REFERENCE TO RELATED APPLICATION

This application claims priority from Korean Patent Application No. 10-2015-0173699, filed Dec. 8, 2015, which is hereby incorporated by reference for all purposes as if fully set forth herein.

BACKGROUND OF THE INVENTION

1. Field of the Invention

The present invention relates to an electric power steering apparatus. More specifically, the present invention relates to an electric power steering apparatus in which, even if vibration and noise are generated from a motor, between the motor or a pulley, and between a belt and the pulley in the process of transmitting a torque of the motor, the vibration and the noise are reduced and prevented from being transferred to a peripheral component, and during the assembly, even if the motor pulley and a nut pulley are not parallel with each other, the belt is mounted in a distorted state, or the tension of the belt is fluctuated. The teeth of the belt and teeth of the pulley are stably engaged with each other such that the vibration and the noise are prevented from being generated between the belt and the pulley, and power consumption is reduced, which enables a steering assist force to be uniformly transmitted to a driver.

2. Description of the Prior Art

FIG. 1 is a view schematically illustrating a configuration of a conventional electric power steering apparatus. FIG. 2 is a schematic cross-sectional view of a portion of FIG. 1.

As illustrated in these drawings, a conventional electric power steering apparatus includes: a driving unit 120 controlled by an Electronic Control Unit (ECU) configured to determine a steering extent of a steering wheel 113 through a torque sensor 111 mounted on a steering column 110; a rack bar 130 configured to move a tie rod 133 connected to a wheel 131 according to the steering extent of the steering wheel 113; and a driven unit 140 configured to receive a rotational force transmitted from the driving unit 120, to convert the rotational force into an axial moving force, and to transmit the axial moving force to the rack bar 130.

Here, as illustrated in FIG. 2, the driving unit 120 includes an electric motor 210 controlled by the ECU, a driving pulley 211 fixed to the motor shaft 212 of the electric motor 210, and a belt 213 wound on the driving pulley 211.

In addition, the driven unit 140 includes a ball nut 230 configured to support the rack bar 130 within the rack housing 220 that encloses the rack bar 130, and a driven pulley 240 and the nut pulley 250 are assembled to the outer peripheral surface of the ball nut 230.

Inner peripheral threads having a hemispherical cross-section are formed in a spiral shape on the inner peripheral surface of the ball nut 230, outer peripheral threads having a hemispherical cross-section are also formed in a spiral shape on the outer peripheral surface of the rack bar 130, and a ball is inserted between the inner peripheral threads and the outer peripheral threads such that the rack bar 130 is moved left and right when the ball nut 230 is rotated.

In the electric power steering apparatus, the driving pulley 211 connected to the motor shaft 212 of the electric motor 210 and the driven pulley 240 coupled to the ball nut 230 are arranged to be parallel with each other, and the belt 213 are wound on the driving pulley 211 and the driven pulley 240 such that the rotational force of the electric motor 210 is transmitted to the rack bar 130, and the rack bar 130 is moved left and right by the operation of the ball nut 230 to generate an auxiliary force.

However, the conventional electric power steering system configured as described above has a problem in that in the process of transmitting the torque of the motor, vibration and noise are generated from the motor, between the motor and the pulley, and the belt and the pulley, and the vibration and noise are transferred to a peripheral component to make a driver feel tired and unpleasant.

In addition, when the belt is mounted in a distorted state or the teeth of the belt and the teeth of the pulley are engaged to be deviated from each other because the motor pulley and the nut pulley are not parallel with each other during the assembly, there is a problem in that the belt is expanded in a diagonal direction such that one side of the belt in the width direction is disengaged or separated from the teeth of the pulley, thereby generating vibration and noise.

Further, there are problems in that the teeth of the belt and the teeth of the pulley are not stably matched with each other due to the change of the tension of the belt, and thus vibration and noise are generated and power loss is increased in the process of transmitting the torque of the motor. Consequently, a steering assist force is not uniformly transmitted to the driver, which makes the driver feel inconvenienced.

SUMMARY OF THE INVENTION

The present invention has been made in the above-described background. An object of the present invention is to provide an electric power steering apparatus in which, even when vibration and noise are generated from a motor, between the motor or a pulley, and between a belt and the pulley in the process of transmitting a torque of the motor, the vibration and the noise are reduced and prevented from being transferred to a peripheral component such that the driver does not feel tired and unpleasant.

In addition, another object is to provide an electric power steering apparatus in which, even if the motor pulley and the nut pulley are not parallel with each other during the assembly or the belt is wound in a distorted state, the teeth of the belt and the teeth of the pulley are stably engaged with each other such that it is possible to prevent vibration and noise from being generated between the belt and the pulley.

Further, another object is to provide an electric power steering apparatus in which even if the tension of the belt is changed, the teeth of the belt and the teeth of the pulley are stably matched with each other so that vibration and noise are prevented from being generated in the process of transmitting the torque of the motor and the power consumption is reduced, which enables a steering assist force to be uniformly transmitted to the driver such that the driver does not feel inconvenienced.

The object of the present invention is not limited to those described above, and other objects, which are not described above, may be clearly understood by a person ordinarily skilled in the art from the following description.

According to the present invention, there may be provided an electric power steering apparatus including a power transmission belt. The power transmission belt includes: an engagement part that is provided inside the power transmission belt where the power transmission belt is engaged with a motor pulley and a nut pulley; and a vibration reduction part that is provided outside the power transmission belt opposite to the engagement part. The engagement part is made of an elastic material, and the vibration reduction part is made of an elastic material that is less rigid than the engagement part.

According to the present invention, even when vibration and noise are generated from a motor, between the motor or a pulley, and between a belt and the pulley in the process of transmitting the torque of the motor, the vibration and the noise are reduced and prevented from being transferred to a peripheral component, which does not make the driver feel tired and unpleasant.

In addition, even if the motor pulley and the nut pulley are not parallel with each other during the assembly or the belt is wound in a distorted state, the teeth of the belt and the teeth of the pulley are stably engaged with each other such that it is possible to prevent vibration and noise from being generated between the belt and the pulley.

Further, even if the tension of the belt is changed, the teeth of the belt and the teeth of the pulley are stably matched with each other such that vibration and noise are prevented from being generated in the process of transmitting the torque of the motor and the power consumption is reduced, which enables a steering assist force to be uniformly transmitted to the driver not to make the driver feel inconvenienced.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
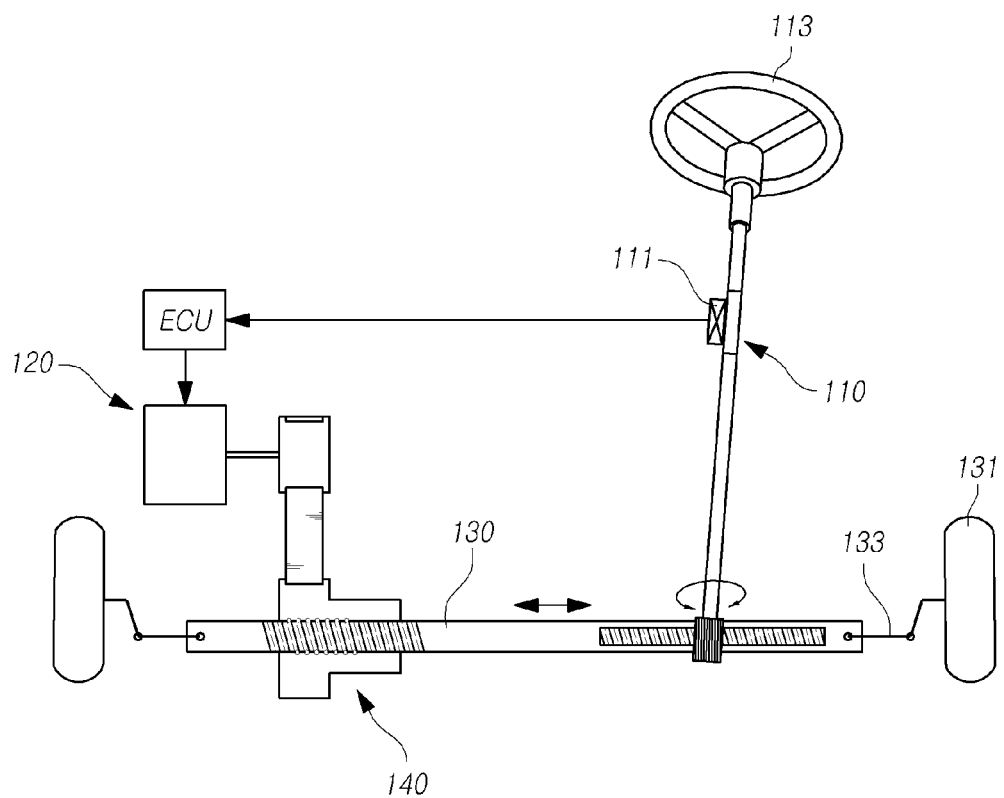
FIG. 1 is a view schematically illustrating a configuration of a conventional electric power steering apparatus.

Hereinafter, some embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
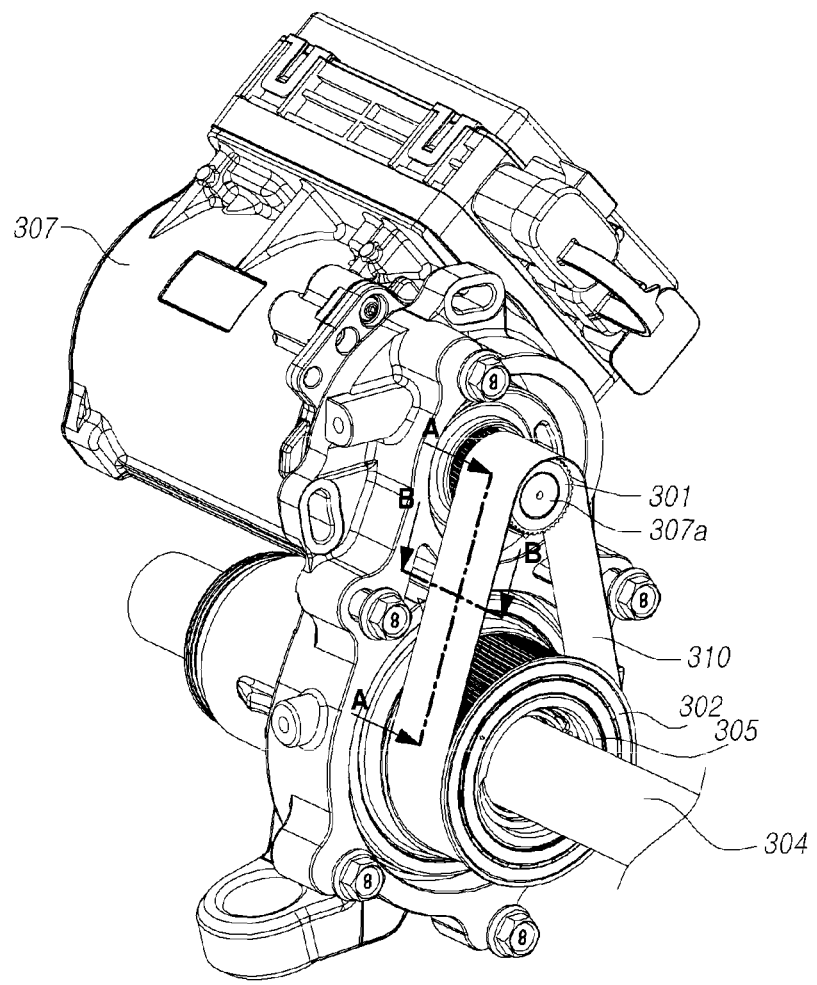
FIG. 3 is a perspective view illustrating an electric power steering apparatus according to one embodiment of the present invention.
Figure 4:
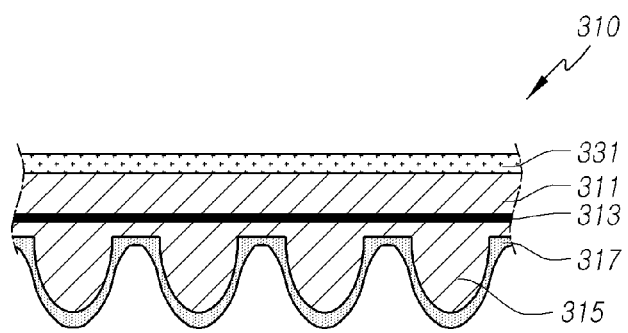
FIG. 4 is a cross-sectional view of a power transmission belt, which is taken along line A-A in FIG. 3.
Figure 5:
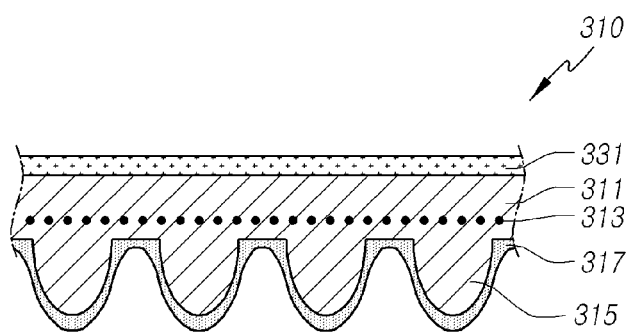
FIG. 5 is a cross-sectional view of the power transmission belt, which is taken along line B-B in FIG. 3.
Figure 6:
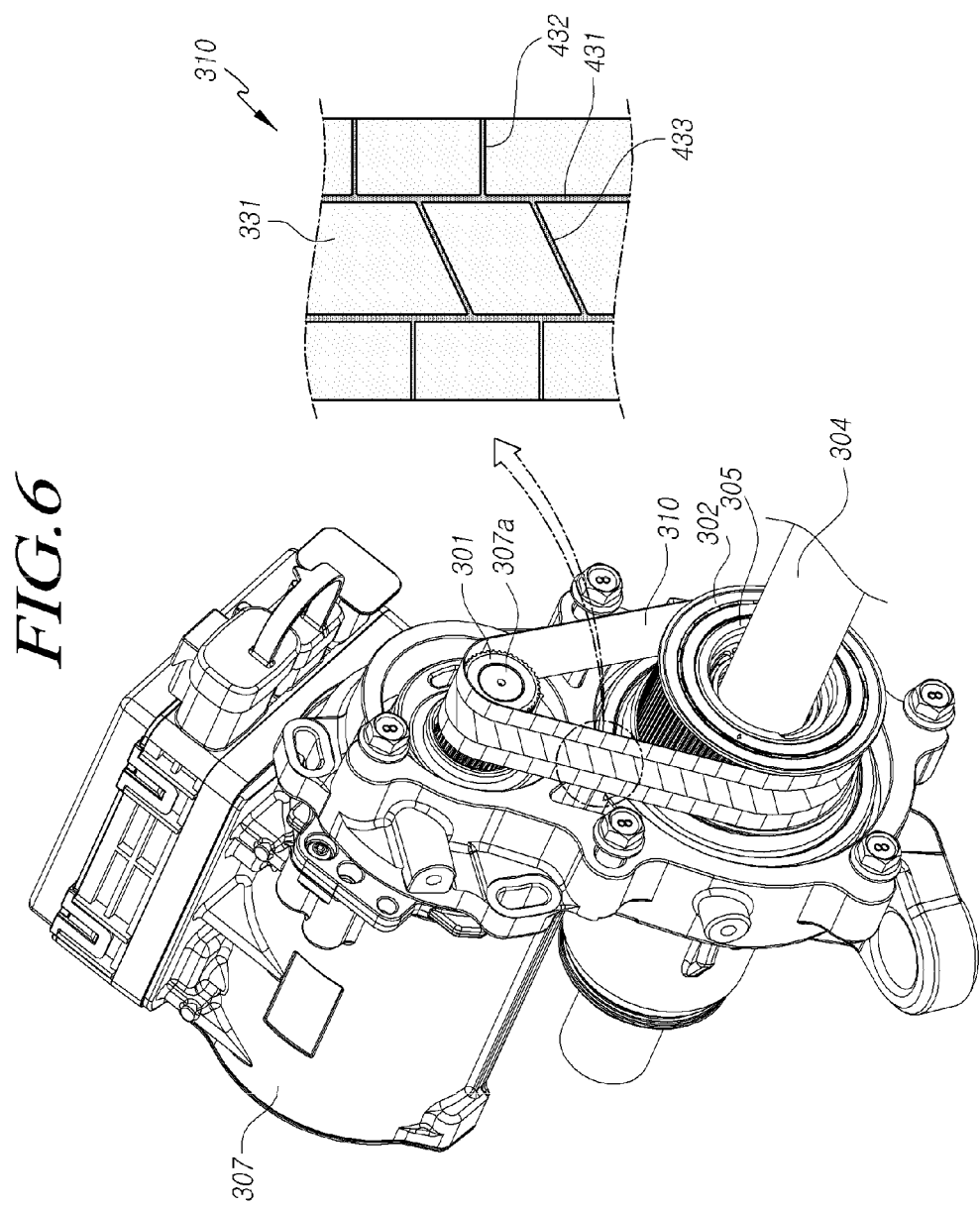
FIG. 6 is a perspective view illustrating the electric power steering apparatus according to one embodiment of the present invention, in which the outer face of the power transmission belt is illustrated in an enlarged scale.
Figure 7A:
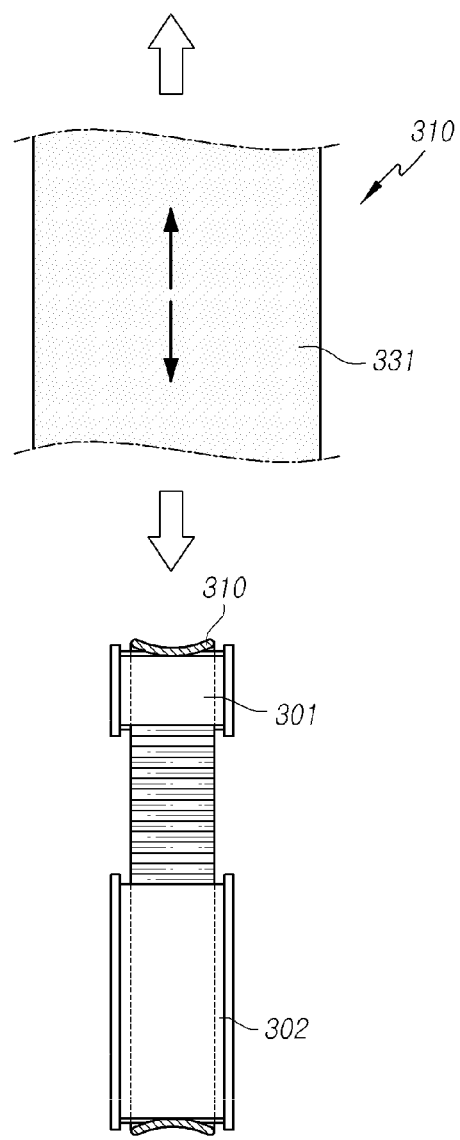
FIGS. 7A and 7B are views illustrating the outer face of the power transmission belt of the electric power steering apparatus according to one embodiment of the present invention when a torsion is generated in the electric power steering apparatus.
Figure 7B:
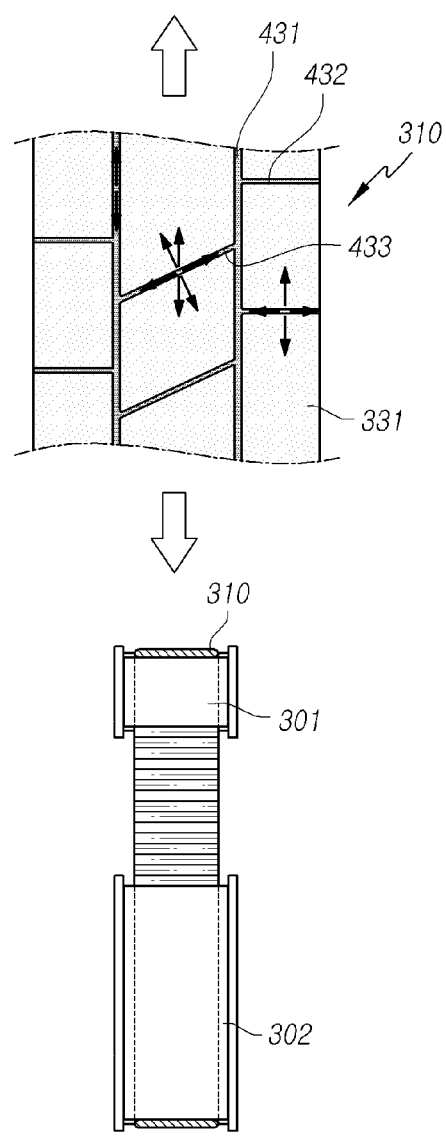
Figure 8A:
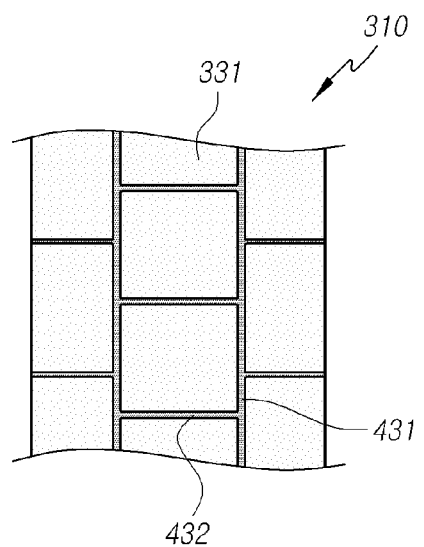
FIGS. 8A and 8B are perspective views illustrating the outer face of a power transmission belt of an electric power steering apparatus according to another embodiment of the present invention.
Figure 8B:
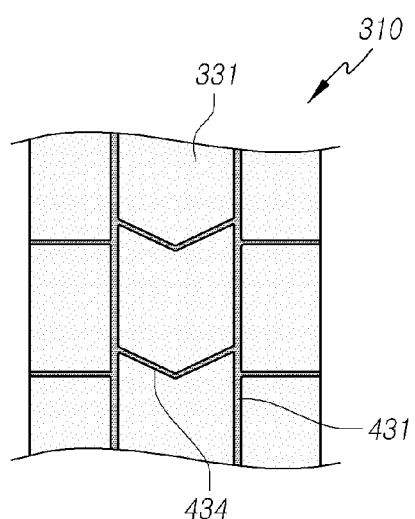

FIG. 3 is a perspective view illustrating an electric power steering apparatus according to one embodiment of the present invention. FIG. 4 is a cross-sectional view of a power transmission belt, which is taken along line A-A in FIG. 3. FIG. 5 is a cross-sectional view of the power transmission belt, which is taken along line B-B in FIG. 3. FIG. 6 is a perspective view illustrating the electric power steering apparatus according to one embodiment of the present invention, in which the outer face of the power transmission belt is illustrated in an enlarged scale. In addition, FIGS. 7A and 7B are views illustrating the outer face of the power transmission belt of the electric power steering apparatus according to one embodiment of the present invention when a torsion is generated in the electric power steering apparatus. Further, FIGS. 8A and 8B are perspective views illustrating the outer face of a power transmission belt of an electric power steering apparatus according to another embodiment of the present invention.

Figure 2:
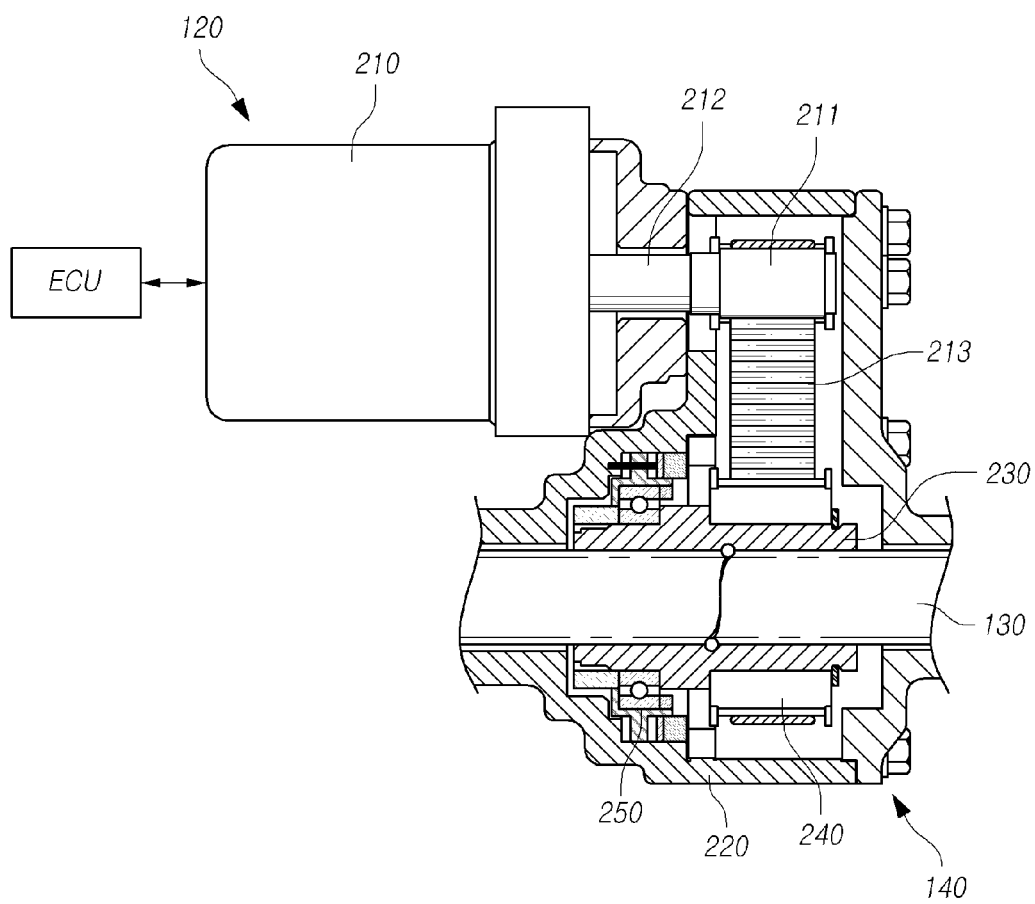
FIG. 2 is a schematic cross-sectional view of a portion of FIG. 1.

As illustrated in these figures as well as in FIG. 2, an electric power steering apparatus according to the present invention includes a power transmission belt 310 that includes: an engagement part 311 that is provided inside the power transmission belt 310 where the power transmission belt 310 is engaged with a motor pulley 301 and a nut pulley 302, and a vibration reduction part 331 that is provided outside the power transmission belt 310 opposite to the engagement part 311. The engagement part 311 is made of an elastic material, and the vibration reduction part 331 is made of an elastic material that is less rigid than the engagement part 311.

In the electric power steering apparatus, the power transmission belt 310 is engaged with the motor pulley 301 that is rotated together with a motor shaft 307a, thereby rotating the nut pulley 302.

The nut pulley 302 is engaged with a ball nut 305 that causes a rack bar 304 to slide left and right such that when the motor 307 is driven by an Electronic Control Unit (ECU), the power transmission belt 310 transmits a rotational force to rotate the ball nut 305.

In addition, when the ball nut 305 is rotated, the rack bar 304 assists a driver's steering force while being slid left and right.

The power transmission belt 310, the motor pulley 301, and the nut pulley 302 are provided inside the rack housing 309.

In this case, the power transmission belt 310 engaged with the motor pulley 301 and the nut pulley 302 may generate noise and vibration according to an engaged state.

When the teeth of the motor pulley 301 and the nut pulley 302 and the teeth 315 formed on the inner face of the power transmission belt 310 are stably engaged with each other, noise and vibration are reduced. However, when the teeth of the motor pulley 301 and the nut pulley 302 and the teeth 315 of the power transmission belt 310 are deviated from each other or are not evenly engaged with each other, noise and vibration are generated, which makes the driver feel unpleasant.

In order to prevent noise and vibration from affecting a peripheral part even if the noise and vibration are generated, the engagement part 311, which is made of an elastic material, is provided on the inner side of the power transmission belt 310, and the vibration reduction part 331, which is made of an elastic material that is less rigid than the engagement part 311, is provided on the opposite side to the engagement part 311.

The engagement part 311 is made of an elastic material and teeth 315 are formed on the inner side of the engagement part 311 to be engaged with the motor pulley 301 and the nut pulley 302, thereby transmitting the driving force of the motor 307 to the ball nut 305.

In addition, in order to reinforce the rigidity of the engagement part 311, several elongated rigidity reinforcement members 313 are provided inside the engagement part 311 in the longitudinal direction of the power transmission belt 310 to be spaced apart from each other.

The rigidity reinforcement members 313 are made of glass fiber to reinforce the rigidity of the engagement part 311.

In addition, the rigidity reinforcement members 313 prevent the power transmission belt 310 from being damaged and cut and reinforce the rigidity of the engagement part 311. Thus, when the power transmission belt 310 is engaged with the motor pulley 301 and the nut pulley 302, the teeth 315 of the power transmission belt 310 and the teeth of the motor pulleys 301 and the nut pulley 302 are stably engaged with each other while maintaining a space therebetween so that power transmission can be smoothly performed.

In order to prevent the teeth 315 of the power transmission belt 310 from being worn out or damaged as the friction and engagement of the teeth 315 of the power transmission belt 310 with the teeth of the pulleys 301 and 302 and the disengagement of the teeth 315 of the power transmission belt 310 from the teeth of the pulleys 301 and 302 are repeated, the teeth 315 of the power transmission belt 310 are coated with a tooth surface-protective material 317.

The tooth surface-protective material 317 is made of a fiber material, such as nylon or aramid, so as to prevent the teeth 315 of the power transmission belt 310 from being worn out or damaged.

Further, on the outer side of the power transmission belt 310, the vibration reduction part 331 is integrally provided, which is softer than the engagement part 311. That is, the vibration reduction part 331 is formed to have a rigidity that is smaller than that of the engagement part 311.

As the vibration reduction part 331 is provided on the power transmission belt 310, vibration and noise generated from the engagement part 311 are absorbed by the vibration reduction part 331 so that the vibration and noise are blocked not to be transferred to a peripheral part.

In addition, the vibration reduction part 331 is integrally formed with the engagement part 311 by double injection, thereby increasing the mass of the engagement part 311.

As the entire mass of the power transmission belt 310 is consequently increased, the vibration and noise generated from the engagement part 311 are reduced, which prevents the driver from feeling tired and unpleasant.

In addition, the natural frequency of the vibration reduction part 331 is smaller than the natural frequency of the engagement part 311 to block vibration and noise generated from the engagement part 311, the motor pulley 301, and the nut pulley 302. That is, because the natural frequencies of the vibration reduction part 331 and the engagement part 311 are different from each other, and the natural frequency of the vibration reduction part 331 is smaller than the natural frequency of the engagement part 311, it is possible to block vibration and noise when the vibration reduction part 331 is provided.

The vibration reduction part 331 is made of a viscoelastic material, which is a material having viscosity and elasticity and absorbs vibration energy mainly through tensile strain.

In particular, the viscoelastic material may more efficiently absorb vibration because it has not only elasticity but also viscosity that is sticky by nature. A mastic resin may be used as the viscoelastic material.

The vibration reduction part 331 made of the mastic resin may reduce about 80% of the vibration generated from the engagement part 311.

For example, when that the vibration generated from the engagement part 311 is about 20 mg, the vibration of the power transmission belt 310 may be reduced to about 3 mg as the engagement part 311 is integrally provided with the vibration reduction part 331 made of the viscoelastic material. Further vibration and noise are blocked substantially not to be transferred to a peripheral part and the driver, thereby preventing the driver from feeling tired and unpleasant.

Meanwhile, as illustrated in FIG. 6, in order to assure that the power transmission belt 310 is stably engaged with the motor pulley 301 and the nut pulley 302, first to third grooves 431 to 433 are provided on the outer surface of the power transmission belt 310.

First, the first groove 431 is formed to continuously extend in the longitudinal direction of the power transmission belt 310, the second groove 432 is formed in the widthwise direction of the power transmission belt 310, and the third groove 433 is formed in a diagonal direction to form a predetermined angle with the longitudinal direction of the power transmission belt 310.

The first to third grooves 431 to 433 distribute the force acting on the power transmission belt 310 such that the power transmission belt 310 can be evenly wound around the motor pulley 301 and the nut pulley 302, and the teeth 315 of the power transmission belt 310 can be stably engaged with the teeth of the motor pulley 301 and the nut pulley 302.

Depending on the positions and arrangement intervals of the first to third grooves 431 to 433 formed on the power transmission belt 310, the surface pressure applied to the pulleys 301 and 302 by the teeth 315 of the power transmission belt 310 is uniformly distributed.

First, in order to ensure that the teeth 315 of the power transmission belt 310 are stably engaged with the teeth of the motor pulley 301 and the nut pulley 302, the first groove 431 is formed plurally, and the second grooves 432 and the third grooves 433 are alternately formed in the widthwise direction of the power transmission belt 310.

If the second grooves 432 or the third grooves 433 are formed to extend from one end to the other end of the power transmission belt 310 in the widthwise direction of the power transmission belt 310, the power transmission belt 310 is distorted along the second groove 432 or the third groove 433, and the teeth 315 of the transmission belt 310 are engaged in the state of being deviated from or overlap with the teeth of the motor pulley 301 and the nut pulley 302, rather than being evenly engaged with the teeth of the motor pulley 301 and the nut pulley 302.

The second grooves 432 and the third grooves 433, which are alternately formed in the widthwise direction, are formed in such a manner in which the ends thereof cross each other. That is, the second grooves 432 and the third grooves 433 are formed not to meet each other.

In addition, a plurality of second groove 432 and a plurality of third groove 433 are formed to be spaced apart from each other at regular intervals in the longitudinal direction of the power transmission belt 310 such that the teeth of the power transmission belt 310 and the teeth of the pulleys 301 and 302 are stably engaged with each other over the entire section of the power transmission belt 310.

In addition, a plurality of first grooves 431 are formed on the outer peripheral surface of the power transmission belt 310, the second grooves 432 are formed between the opposite ends of the power transmission belt 310 in the widthwise direction of the power transmission belt 310, and the third grooves 433 are formed between the first grooves 431.

That is, on the outer surface of the vibration reduction part 331, the third grooves 433 are formed between the plurality of first grooves 431, and the second grooves 432 are formed at the opposite sides of the third grooves 433 in the widthwise direction such that, even if load acts on the power transmission belt 310 in the longitudinal direction, in the widthwise direction, and in the diagonal direction, the power transmission belt 310 are entirely evenly engaged with the pulleys 301 and 302.

In other words, when the load acts on the power transmission belt 310 in the longitudinal direction, in the widthwise direction, and in the diagonal direction, component forces are generated by each of the grooves 431 to 433, and the power transmission belt 310 is capable of being stably seated on the pulleys 301 and 302 such that the power transmission belt 310 are entirely evenly engaged with the pulleys 301 and 302 due to such component forces.

The first to third grooves 431 to 433 will be described with reference to FIGS. 7A and 7B. FIG. 7A illustrates a state in which a tension is generated in the power transmission belt 310 in a case where the grooves 431 to 433 are not formed.

Referring to FIG. 7A, the tension is reduced toward the widthwise outside of the power transmission belt 310, and in particular, the power transmission belt 310 is flexed to the opposite side to the pulleys as the surface of the power transmission belt 310 is pulled by the tension.

Due to this, only some of the teeth 315 of the power transmission belt 310 are engaged with the motor pulley 301 and the nut pulley 302 such that vibration and noise may be generated.

In addition, in a severe case, the teeth 315 of the power transmission belt 310 may be disengaged from the teeth of the motor pulley 301 and the nut pulley 302.

In addition, in the case where at the time of assembling the power transmission belt 310, the motor pulley 301 and the nut pulley 302 are assembled not to be parallel with each other, or the power transmission belt 310 is distorted as the teeth of the motor pulley 301 and the nut pulley 302 and the teeth 315 of the power transmission belt 310 are deviated from each other, in some cases, even if one side of the power transmission belt 310 is stably engaged with the motor pulley 301 and the nut pulley 302 while being driven, the other side of the power transmission belt 310 is floated or disengaged from the motor pulley 301 and the nut pulley 302.

FIG. 7B illustrates a state in which a tension is generated in the power transmission belt 310 in a case where the grooves 431 to 433 are formed.

Referring to FIG. 7B, when load acts on the power transmission belt 310, component forces are generated due to the grooves 431 to 433 formed on the outer surface thereof, and the component forces offset the action of pulling the power transmission belt 310 due to the tension, thereby making the surface pressure evenly distributed.

Due to this, the power transmission belt 310 may be stably matched with the motor pulley 301 and the nut pulley 302 because no portion in the power transmission belt 310 is floated or disengaged from the motor pulley 301 and the nut pulley 302.

In addition, even if the tension of the power transmission belt 310 varies or the motor pulley 301 and the nut pulley 302 are coupled not to be parallel with each other, the power transmission belt 310 can be evenly engaged with, and stably seated on, the motor pulley 301 and the nut pulley 302.

As a result, vibration and noise between the power transmission belt 310 and the motor pulley 301 and the nut pulley 302 can be prevented, and the driving force of the motor 307 can be transmitted to the ball nut 305 without loss of power.

In addition, as illustrated in FIGS. 8A and 8B, the first to third grooves 431 to 433 are symmetrically formed in the widthwise direction of the power transmission belt 310 such that the power transmission belt 310 is evenly engaged as a whole such that any one side of the power transmission belt 310 in the widthwise direction does not get loose.

FIG. 8A is a view illustrating an example in which the grooves 431, 432, and 433 are symmetrically formed in the widthwise direction of the power transmission belt 310. A plurality of first grooves 431 are formed to be spaced apart from each other in the widthwise direction of the power transmission belt 310, and the second grooves 432 are formed between the first grooves 431 to be spaced apart from each other in the longitudinal direction of the power transmission belt 310.

Further, the second grooves 432 are formed to be spaced apart from each other at regular intervals in the longitudinal direction of the power transmission belt 310, and the second grooves 432 are symmetrically formed in the widthwise direction such that the ends of the second grooves 432 are not connected with each other while crossing each other.

If the second grooves 432 are formed to be connected to each other, the power transmission belt 310 is distorted, and thus some of the teeth 315 of the power transmission belt 310 are deviated from or overlap with the teeth of the motor pulley 301 and the nut pulley 302, rather than being evenly engaged with the teeth of the motor pulley 301 and the nut pulley 302.

FIG. 8B is a view illustrating another example in which the grooves 431, 432, and 434 are symmetrically formed in the widthwise direction of the power transmission belt 310. The third grooves 434 are formed in a centrally folded "V" shape to diagonally extend and to have a symmetric shape. The third grooves 434 are provided between the first grooves 431.

Further, on the opposite sides of the third grooves 434 in the widthwise direction of the power transmission belt 310, the grooves 431, 432, and 434 are symmetrically formed in the widthwise direction of the power transmission belt 310.

As the grooves 431, 432, and 434 are symmetrically formed in the widthwise direction of the power transmission belt 310 as described above, the power transmission belt 310 is evenly engaged such that any one side of the power transmission belt 310 in the widthwise direction does not get loose, thereby reducing a power loss and uniformly transmitting a steering assist force to the driver.

According to the embodiments of the present invention, which have the shapes and structures described above, even when vibration and noise are generated from a motor, between the motor or a pulley, and between a belt and the pulley in the process of transmitting the torque of the motor, the vibration and noise are reduced and prevented from being transferred to a peripheral component, which does not make the driver feel tired and unpleasant.

In addition, even if the motor pulley and the nut pulley are not parallel with each other during the assembly or the belt is wound in a distorted state, the teeth of the belt and the teeth of the pulley are stably engaged with each other such that it is possible to prevent vibration and noise from being generated between the belt and the pulley.

Further, even if the tension of the belt is changed, the teeth of the belt and the teeth of the pulley are stably matched with each other such that vibration and noise are prevented from being generated in the process of transmitting the torque of the motor and the power consumption is reduced, which enables a steering assist force to be uniformly transmitted to the driver not to make the driver feel inconvenienced.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus including a power transmission belt, wherein the power transmission belt comprises:

an engagement part that is provided inside the power transmission belt where the power transmission belt is engaged with a motor pulley and a nut pulley; and a vibration reduction part that is provided as an outer portion of the power transmission belt opposite to the engagement part, wherein a first groove in a longitudinal direction of the power transmission belt, a second groove in a widthwise direction of the power transmission belt, and a third groove in a diagonal direction of the power transmission belt are formed on an outer surface of the vibration reduction part.

2. The electric power steering apparatus of claim 1, wherein a plurality of rigidity reinforcement members made of a glass fiber material are embedded inside the engagement part.

3. The electric power steering apparatus of claim 1, wherein the engagement part is coated with a tooth surface-protective material made of a fiber material on tooth surfaces of the motor pulley and the nut pulley.

4. The electric power steering apparatus of claim 1, wherein the vibration reduction part has a natural frequency that is less than that of the power transmission belt so as to block vibration and noise generated from the power transmission belt.

5. The electric power steering apparatus of claim 1, wherein a plurality of second grooves and a plurality of third grooves are formed to be spaced apart from each other at regular intervals in the longitudinal direction of the power transmission belt.

6. The electric power steering apparatus of claim 5, wherein, on the outer surface of the vibration reduction part, the third grooves are formed between the plurality of first grooves and the second grooves are formed on opposite sides of the third grooves in the widthwise direction of the power transmission belt.

7. The electric power steering apparatus of claim 1, wherein the first groove, the second groove, and the third groove are symmetrically formed.

8. The electric power steering apparatus of claim 7, wherein the third groove is formed in a centrally folded shape to be formed in the diagonal direction and a symmetrical shape.

* * * * *